(12) United States Patent
Gault et al.

(10) Patent No.: US 9,178,708 B2
(45) Date of Patent: Nov. 3, 2015

(54) NON-DETERMINISTIC TIME SYSTEMS AND METHODS

(71) Applicant: GUARDTIME IP HOLDINGS LIMITED, Tortola (VG)

(72) Inventors: Michael Gault, Hong Kong (HK); Ahto Truu, Tartu (EE); Ahto Buldas, Tallinn (EE); Martin Ruubel, Tallinn (EE); Jeffrey Pearce, Hilo, HI (US)

(73) Assignee: GUARDTIME IP HOLDINGS LIMITED, Tortola (VG)

( * ) Notice: Subject to any disclaimer, the term of this patent is extended or adjusted under 35 U.S.C. 154(b) by 164 days.

(21) Appl. No.: 14/094,252

(22) Filed: Dec. 2, 2013

(65) Prior Publication Data

US 2015/0156026 A1 Jun. 4, 2015

(51) Int. Cl.
*H04L 29/06* (2006.01)
*G06F 21/00* (2013.01)
*H04L 9/32* (2006.01)
*G06Q 20/00* (2012.01)

(52) U.S. Cl.
CPC .............. *H04L 9/3297* (2013.01); *G06Q 20/00* (2013.01); *H04L 9/3247* (2013.01); *H04L 9/3265* (2013.01)

(58) Field of Classification Search
CPC ... H04L 9/3297; H04L 9/3265; H04L 9/3247; G06Q 20/00
See application file for complete search history.

(56) References Cited

U.S. PATENT DOCUMENTS

| | | | | |
|---|---|---|---|---|
| 6,157,621 | A * | 12/2000 | Brown et al. | 370/310 |
| 2008/0288779 | A1 * | 11/2008 | Zhang et al. | 713/178 |
| 2010/0212017 | A1 * | 8/2010 | Li et al. | 726/26 |
| 2011/0213700 | A1 * | 9/2011 | Sant'Anselmo | 705/39 |
| 2015/0178494 | A1 * | 6/2015 | Taratine et al. | 726/1 |

\* cited by examiner

*Primary Examiner* — Lisa Lewis
(74) *Attorney, Agent, or Firm* — Jeffrey Pearce

(57) ABSTRACT

A capture device such as a camera and/or sound recorder records an event, which includes a visual and/or audible presentation of a time value that is non-deterministic, yet a function of physical time. The non-deterministic time value (NDT) may be generated as a function of a calendar value created at time intervals as a root hash value of a distributed, hash-tree document authentication infrastructure. If the NDT value included in the recording of the event does not match the NDT value corresponding to the calendar value from which it was generated, the recording may be assumed to be altered. Digital time-stamping may be included for the recording of the event to reduce the opportunity for backdating of the recording. NDT may also be generated simply for display by a clock, for example as an NDT time zone.

22 Claims, 11 Drawing Sheets

NON-DETERMINISTIC TIME SYSTEMS AND METHODS

FIELD OF THE INVENTION

This invention relates to an electronic system and method for generating a representation of non-deterministic time that can be used for, among other things, verifying that an event did not occur before a specific time.

BACKGROUND

In the age of digital imaging and high-quality image-editing software, the maxim "Seeing is believing" is becoming increasingly out-dated. Nowadays, few cosmetic or clothing advertisements, billboards, magazine photos of celebrities, etc., are not digitally altered in some way. In fact, so many people have come to internalize a visually false portrayal of "reality" that at its 2011 meeting, the American Medical Association adopted a proposal calling on advertisers to develop guidelines to discourage the altering of photographs in a manner that could promote unrealistic expectations of appropriate body image. One attendee observed: "The appearance of advertisements with extremely altered models can create unrealistic expectations of appropriate body image. In one image, a model's waist was slimmed so severely, her head appeared to be wider than her waist." The issue of altered images warping peoples' perceptions of some form of ideal has even reached the political level. In 2009, for example, various politicians in France proposed a law that would require a "warning" label on all advertising, press, political campaign, art photography and packaging images if an image has been retouched, in particular, digitally altered.

Alteration of image content is only one aspect of the concerns involving image manipulation: In many cases, the time an image is created may also be essential information. For example, the time an image was first created can be the determining factor in the relevance of photographic or video evidence in a criminal trial. At present, in many jurisdictions, whether an image or sound recording is admissible as trial evidence is typically left to the discretion of the judge, and whether the admitted evidence proves the occurrence or non-occurrence of some event at a given time is often a question that the court—either the judge or jury or both—decides at least in part subjectively. This means that the accuracy of the determination is a function of the relative sophistication of the forger versus the court.

Similarly, a casino manager or a punter watching an online horse race will want to know if the video he is watching is really "live", or at least is showing events at the times they are supposed to have happened. With known technology, these viewers must mostly simply trust that there is no manipulation happening, hoping that later information confirms what they saw/heard.

As every tourist knows, a camera can be set to show the time/date a photo was taken. This time/date value, however, proves little or nothing, since it is so easy to change these settings in a camera. The time/date value could be derived from some external source, but this then simply moves the question of reliability from the local device to that external source and the transmission medium between the two.

A more sophisticated method would be to submit the contents of the image to a service that digitally time-stamps them, perhaps along with image metadata. One of the problems with traditional digital time-stamping, however, is that it proves only that data existed before a particular point in time—one can easily take a photo, edit it, then later digitally time-stamp the edited version, thereby forward-dating the image. In other words, typical time-stamping can establish the latest time an image could have been time-stamped, but this doesn't prove that it couldn't have been created and altered earlier. Traditional digital time-stamping works well if there is general acceptance of the time something happened. For example, if a major unexpected news event is generally known to have occurred at 11:37:46 UTC and a photo of the event is digitally time-stamped indicating 11:37:46 UTC, then there is an exceptionally low probability that the photographer will have had time to edit the photograph at all before obtaining the time stamp. Absent such an external confirmatory event, however, conventional digital time-stamping may provide a high level of assurance that an image hasn't been back-dated, but it typically cannot enable detection of forward-dating.

One other drawback of traditional digital time-stamping schemes is the nature of the schemes themselves. Many known digital time stamps rely on a public key infrastructure (PKI). In the context of time determination, one disadvantage of PKI-based time-stamping systems is that users of such systems must simply trust the accuracy of the system's time reading, even though there is no ability to independently verify it after the fact. One other disadvantage of such PKI-based signing schemes is that, by their very nature, they require the creation, administration and maintenance of the keys. Moreover, for reasons of security, digital certificates, and the PKI keys underlying them, are often allowed to expire. PKI keys also have an operational lifetime after which information that has been time-stamped with those keys needs to be re-time-stamped in order to ensure the time stamp is still valid. A compromise of those keys, or even the possibility of a compromise (by insiders intent on fraud or outsiders, such as hackers, intent on profiting from a key compromise) will cause the digital time stamp to be easily challenged. Digital time-stamping is thus not absolute proof but rather more an attestation by the authority that administers the keys.

The problems just described also apply to other types of data. For example, there may be a need to verify the time of a recorded audio event. Audio files are often even easier to edit and forward-date than video.

Part of the problem of temporal visual/audible data verification is that conventional time is deterministic and therefore predictable: If one knows the exact time right now, then one will also know the exact time n seconds (or other time unit) from now. This means that one has n seconds from actual occurrence/creation of an event to manipulate the corresponding data file and then have the altered data stamped with a desired future time.

It would therefore be good to have a way to establish the time of a perceptibly created or recorded event with less opportunity for undetected manipulation. More generally, it would be advantageous to have some representation of time that isn't deterministic and therefore predictable.

DETAILED DESCRIPTION

In broad terms, this invention provides a method and various system implementations that generate a representation of non-deterministic time. The invention is described primarily with reference to examples that relate to a type of clock that can be used to mark captured representations of events so as to establish the time of capture in a way that greatly reduces the opportunity to forward-date altered representations. According to one preferred aspect, non-deterministic time is established based on an output of a keyless, distributed hash tree infrastructure, which may also optionally be used to authenticate the contents of the representation of the event as well. Before explaining the notion and use of non-deterministic time, such a keyless, distributed hash tree infrastructure is therefore described first.

Distributed Hash Tree Infrastructure

Figure 1:
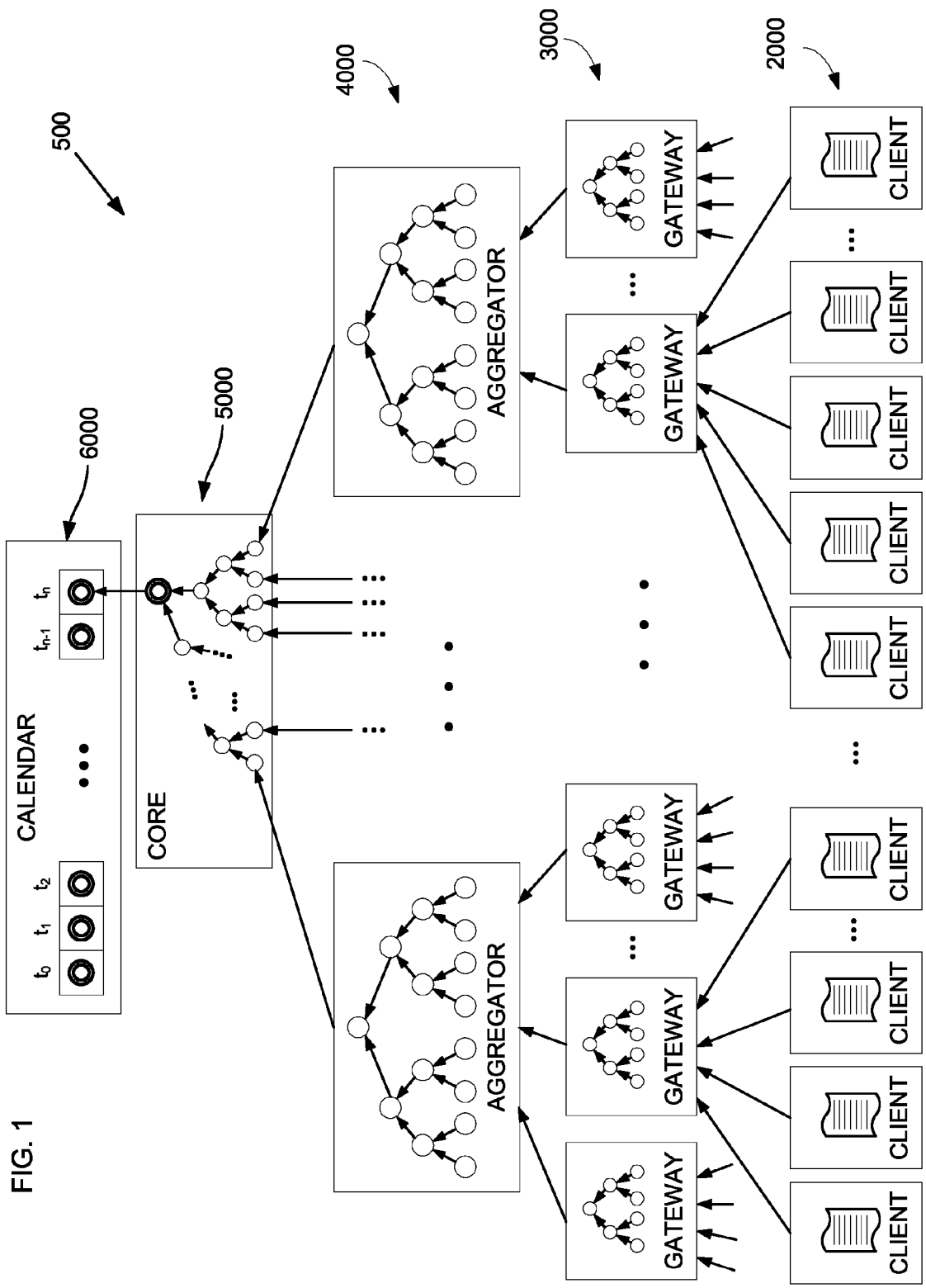
FIG. 1 illustrates various layers of a generalized digital record verification and signing infrastructure, which further illustrates the generation of calendar values that can serve as the basis of non-deterministic time determination.
Figure 2:
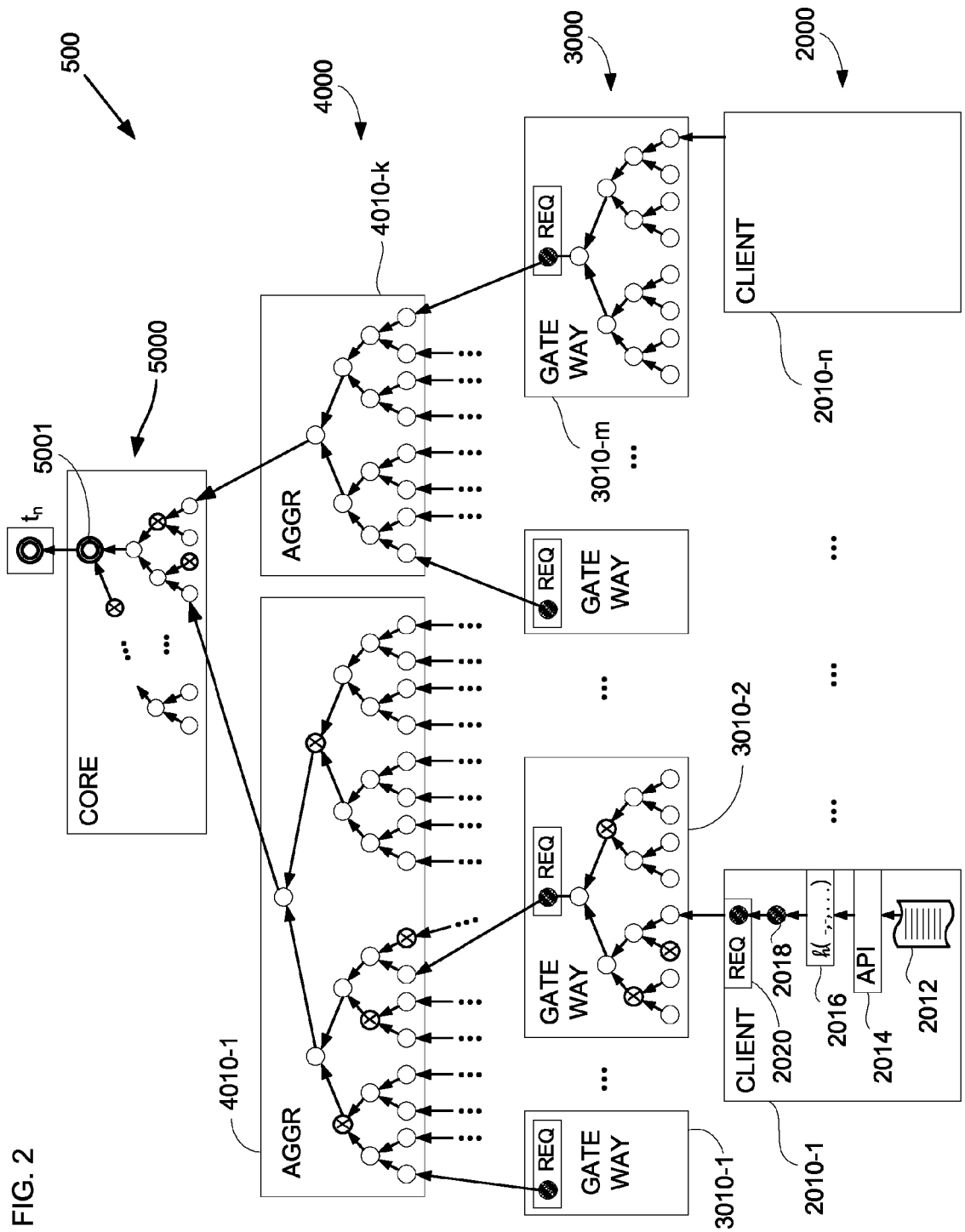
FIG. 2 illustrates the verification infrastructure along with various data and computational structures maintained and computed within the different layers to obtain a calendar value at the end of a time interval.

FIGS. 1 and 2 illustrate a distributed, keyless, hash tree-based digital record-authentication infrastructure such as is provided by Guardtime AS of Tallinn, Estonia. The general infrastructure has several different layers: a client layer 2000 comprising a number of client systems; a layer of gateways 3000; a layer including one or more aggregation systems 4000; and an uppermost layer 5000 that includes a "core". Although FIG. 1 shows the various layers as being separate and distinct, some implementations of the main principles of the infrastructure might consolidate or do without some of the layers or might need to add additional layers for administrative or other purposes.

As FIG. 1 also illustrates, the core layer 5000 will in general be common to all users of the system, whereas lower layers 2000, 3000, 4000 will in many implementations have a unique configuration depending on the needs and preferences of users. The distinction between "core/common" and "unique/distributed" is not hard and fast, however—in some implementations, the core, that is, centrally administered system, will encompass structures and functions that also are used in lower layers. One of the advantages of this infrastructure is that it allows for almost unlimited scalability and reconfiguration of the non-core layers to meet particular implementation needs. All that is required is that the various layers perform the specified functions, with common protocols for entering a digital record into the verification system and for generating registration requests.

In the illustrated arrangement, a client is the system where digital records are prepared and entered into the verification/signature system. A digital record may be any set of binary data that one later wishes to verify has not changed since initial registration and signing using the infrastructure. Thus, the term "digital record" could a digital representation of an image, an audio file (or combined audio-visual data such as from a video camera), a digitally created or converted document, etc. Generally, a "digital record" therefore may be anything that can be represented as a set of binary data, regardless of source, manner of creation or method of storage. In short, a client is any system where a representation of any type of information is input, created or otherwise presented (with or without human involvement) in digital form such that it can be processed and registered using the infrastructure according to the invention.

A gateway in the layer 3000 will typically be a computer system such as a server with which one or more of the clients communicates so as to receive requests for registration of each digital record that a client submits. In many implementations, a gateway will be a server controlled by an enterprise or some third-party provider, which may be a server known to and maybe even controlled by an organization to which the client user belongs, or a server accessed through a network such as the Internet. In short, a gateway may generally be any server located anywhere and configured to receive requests from clients for digital record registration. Gateway systems do not need to be of the same type; rather, one gateway might be a server within a company that employs many clients, whereas another gateway might be a server accessible online by arbitrary users.

An aggregator in the aggregation layer 4000 will similarly be a computer system such as a server intended to receive registration requests that have been consolidated by respective gateways. Depending upon the scale and design requirements of a given implementation, any aggregator could also be controlled by the owner of the core, or the owner of the same systems as the gateways and clients, or could be provided by an entirely different entity, and in some cases it would also be possible to consolidate the aggregator and gateways for particular set of clients.

As an example, large corporations or government entities might prefer to implement and benefit from the advantages of the infrastructure using only their own dedicated systems. Nearer the other end of the spectrum of possibilities would be that the gateways and aggregators could all be configured using "cloud computing" such that a user at the client level has no idea where any particular gateway or aggregator is located or who controls the servers. One of the advantages of this infrastructure is that digital input records can still be verified with near total security even in situations where users and others do not know if they can trust the systems in the gateway or aggregation layers 3000, 4000; indeed, it is not even necessary to trust the administrator of the core 5000 in order to have essentially total reliability of verification.

The different terms "aggregator" in layer(s) 4000 and "gateway" in layer(s) 3000 are not intended to imply that the systems (such as servers) that comprise them are functionally significantly different—a gateway "aggregates" the requests of the clients it serves and as such could be viewed as a "local" or "lower level" aggregator in its own right. In many implementations, however, gateways may be under the control of entities more closely associated with the clients and aggregators may be more closely associated with the overall system administrator that maintains the core. This is not a hard and fast distinction, however.

FIG. 2 shows the infrastructure of FIG. 1 in more detail. In particular, FIG. 2 illustrates various data structures used in the authentication process. In FIG. 2, the various clients are represented as 2010-1, ..., 2010-n; gateways are represented as 3010-1, 3010-2, ..., 3010-m; and two (by way of example only) aggregators are shown as 4010-1, 4010-k. An aggregator will typically communicate into each of the lowest level hash tree nodes within the core, as described in more detail below. Only two aggregators are shown in FIG. 2 for the sake of simplicity.

In one implementation, each client system that wishes to use the verification infrastructure is loaded with a software package or internal system routines for convenient or even automatic communication and submission "upwards" of digital information. The software package may include some application program interface (API) 2014 that transforms submitted digital records into a proper form for processing. A digital record 2012 created, selected, or otherwise input in any way is then submitted by way of the API 2014 to a software module 2016 that uses the digital data from the record 2012 as at least one argument in a transformation function such as a hash function.

Cryptographic hash functions are very well known in many areas of computer science and are therefore not described in greater detail here. Just one of many possible examples of a common class of hash functions that are suitable for use in this infrastructure is the "secure hash algorithm" (SHA) family.

Additional hashing within the client may be desired to include additional information depending on the design protocol of the infrastructure. Just a few of the many possible arguments the system designer might optionally choose to include as arguments of the additional hash function 2016 are an identifier of the person or entity requesting registration, an identifier of the particular client system being used, a time indication, information relating to the geographic location of the client or other system, or any other information desired to be incorporated as part of the registration request. A software module 2020 is preferably included to transmit the output of the transformation 2016 to higher layers of the infrastructure as a request (REQ), along with any other parameters and data necessary to communicate with a gateway and initiate the registration request.

It is assumed in this discussion that the transformation function 2016 is a hash function because this will be the most common and efficient design choice, and also because the properties of hash functions are so well understood; moreover, many different hash functions are used in the field of cryptology, security, etc., within commodity computers. One other advantageous property of hash functions is that they can reduce even large amounts of digital information to a size that is more easily processed, with a statistically insignificant chance of two different inputs leading to the same output. In other words, many well-known hash functions will be suitable for use throughout the infrastructure, and can be chosen using normal design considerations. Nonetheless, the function that transforms digital records into a form suitable for submission as a request need not be a hash function as long as its properties are known. For example, especially for small digital records, it may be more efficient simply to transmit the digital record data as is, in its entirety or some subset; in this case, the transformation function may simply be viewed as an identity function, which may then also append whatever other additional information is needed according to the core system administration to form a proper registration request.

The data structure of a binary hash tree is illustrated within the gateway 3010-2. The lowest level nodes of the gateway hash tree will correspond to the transformed dataset 2018 submitted as a request from a client, along with any other parameters or data used in any given implementation to form a request. As illustrated, the values represented by each pair of nodes in the data structure form inputs to a parent node, which then computes a combined output value, for example, as a hash of the two input values from its "children" nodes. Each thus combined output/hash value is then submitted as one of two inputs to a "grandparent" node, which in turn computes a combined output/hash value for these two inputs, and so on, until a single combined output/hash value is computed for the top node in the gateway.

Aggregators such as the system 4010-1 similarly include computation modules that compute combined output values for each node of a hash tree data structure. As in the gateways, the value computed for each node in the aggregator's data structure uses its two "children" nodes as inputs. Each aggregator will therefore ultimately compute an uppermost combined output value—a "root hash value"—as the result of application of a hash function that includes information derived from the digital input record(s) of every client that submitted a request to a gateway in the data structure under that aggregator. Although it is of course possible, the aggregator layer 4000 does not necessarily need to be controlled by the same system administrator that is in charge of the core layer 5000. In other words, as long as they are implemented according to the required protocols and use the correct hash functions (or whatever other type of function is chosen in a given implementation), then the client, gateway, and aggregation layers may be configured to use any type of architecture that various users prefer.

In one embodiment, the core 5000 is maintained and controlled by the overall system administrator. Within the core, a hash tree data structure is computed using the root hash values of each aggregator as lowest level inputs. In effect, the hash computations and structure within the core form an aggregation of aggregation values. The core will therefore compute a single current uppermost core hash value at the respective tree node 5001 at each calendar time interval t0, t1, . . . , tn. This uppermost value is referred to here alternatively as the "calendar value" $C_i$ or "current calendar value" for the time interval ti.

Note that the time origin and granularity are both design choices. For example, one might choose each time interval to be uniformly 1.0 seconds. On the other hand, if significant network delay is anticipated or measured, it may be preferable to set the calendar time interval to a greater value. Less frequent computation of calendar values might also be chosen to suit the administrative or other needs of a verification infrastructure implemented totally within a single enterprise or for any other reason.

Conversely, if there is some need for finer temporal granularity, then one could decrease the time interval such that calendar values are generated more frequently than once a second. System designers may choose an appropriate time granularity based on such factors as the anticipated processing load, network bandwidth and transmission rate, etc.

Note that the uppermost tree node 5001 represents the root node of the entire tree structure of nodes junior to it. As is explained later, this will change upon recomputation of a new uppermost core hash value at the end of the next period of accumulating requests and generating signature vectors (also referred to as "data signatures") containing recomputation parameters.

In FIG. 2, certain ones of the hash tree nodes in the gateway 3010-2, the aggregator 4010-1, and the core 5000 are marked with an "X". Notice if one traverses the various tree paths upward from the value 2018 in the client 2010-1, it is possible to compute every value upward in the tree structures all the way to the most current uppermost core value 5001 given the values in the X-marked tree nodes (the siblings of the nodes in the direct recomputation path) and a knowledge of the hash functions applied at each successive parent node. In short, if a signature is associated with the digital record 2012 that includes all of the "X marked" values, and assuming predetermined hash functions (which may of course be the same or different functions), then re-computation of the hash values upward through all of the tree structures will yield the same value as in the current calendar value, but only if the starting input value representing the original digital record is in fact identical in every respect to the original. Even the slightest alteration to the digital input record or even a change of a single bit in any of the values of the signature associated with a record 2012 will lead to a re-computed calendar value that is not identical to the one in node 5001. Note also that each uppermost computed value in the core—the current calendar value—contains information derived from every digital input record that is input into the system during the current calendar time interval.

Figure 3:
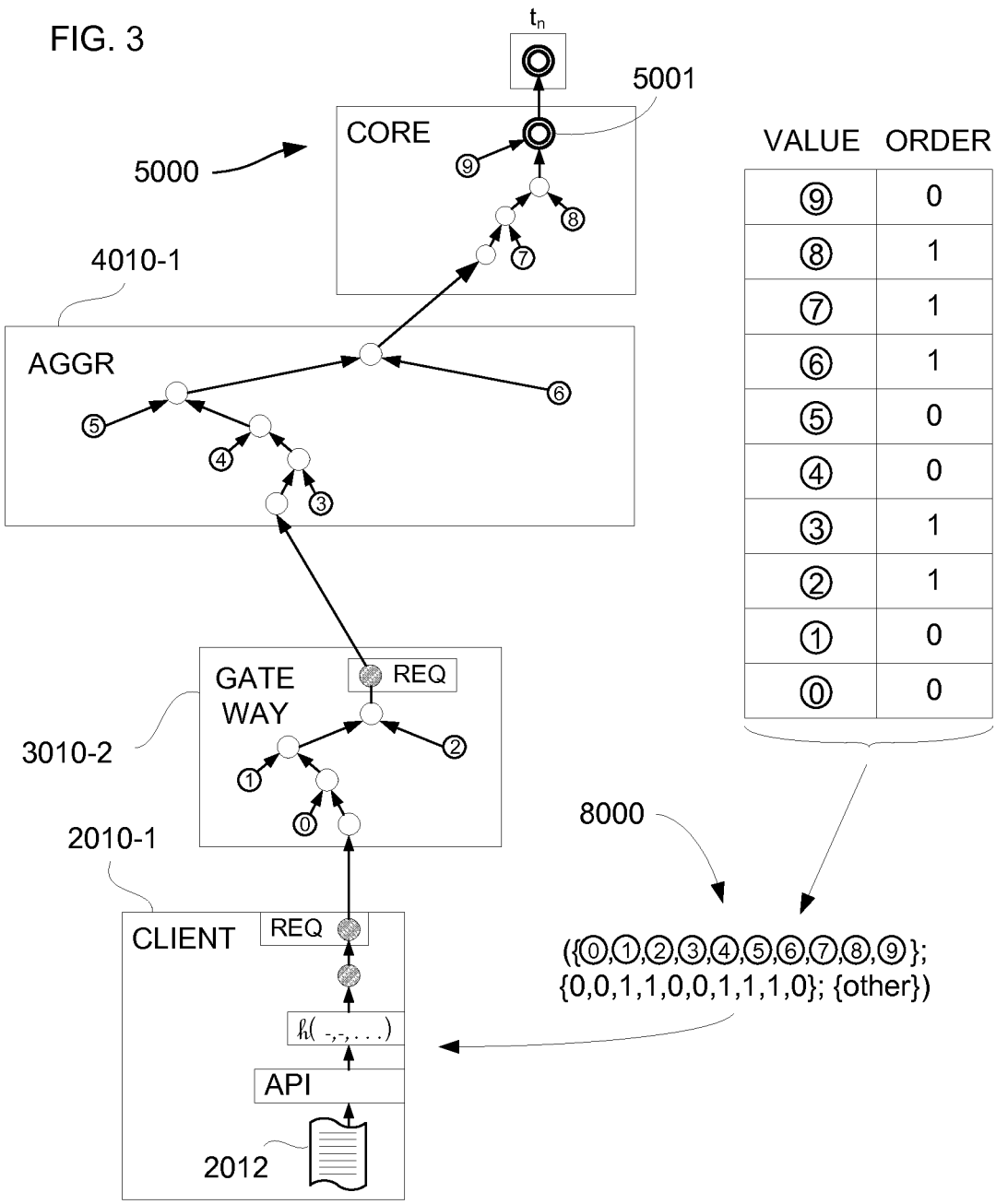
FIG. 3 shows a subset of FIG. 2 to illustrate a digital signature and recomputation of authentication values using the signature.

FIG. 3 illustrates the "reduced" infrastructure whose hash tree node values contain the information necessary to recompute the hash tree path all the way to the top of the system to the value in node 5001. It is not necessary for the recomputation to be carried out in any gateway, aggregator or the core; indeed, it is not even necessary for recomputation to take place within the same client 2010-1 that originally submitted the verification request for the digital record 2012. All that is necessary is the vector containing the "sibling" tree values at each level, as well as knowledge of which hash functions are used to compute each parent node. In other words, given this information, even a third-party would be able to perform the recomputation and compare with the node value 5001 and thereby either authenticate any given representation of what is supposed to be digital record 2012, or detect any difference.

In FIG. 3, the sibling hash values needed for recomputation are numbered 0-9. If nodes are created in time order, and if order is important in the chosen hash function, then whether a sibling at each level is to the "right" or "left" in the hash structure will be relevant. In the example shown in FIG. 3, not only the value but also the order (0: from left, 1: from right) is indicated in the vector ({sibling values 0-9}, {order bits}, {other}) returned along with any other chosen information (for example, the physical/clock time the current calendar value corresponds to) as the data signature 8000. At this point, one may see one advantage of using a binary hash tree structure: at each level, there will be only one sibling value needed for upward recomputation. Although a non-binary tree structure would be possible, one would then have to accept the increased computational, storage, and data-structural complexity. Comparing FIG. 2 and FIG. 3, one can also see that the computational burden to validate one of a set of N digital input records at any given time interval is proportional to only $\log_2 N$.

To increase independence of the various layers—in particular, clients and later entities wishing to perform authentication through recomputation—it is advantageous for the entire calendar to be passed to the aggregators and even to the lower layers, even as far as to clients, every time a new calendar value is computed, that is, at the end of each calendar time interval. This then allows delegation and distribution of the computational workload without any compromise of the integrity of the system. If the respective calendar value is passed down along with each data signature vector, it would therefore be possible to authenticate a digital record up to the level of the calendar value without any need for the infrastructure at all; rather, any user with the ability to compute hash values in the proper order, given the signature vector and respective calendar value, could authenticate a digital record presented as being identical to the original.

FIG. 1 shows a database or file (the "calendar") 6000 in the core that includes all calendar values either from some starting time, or, preferably, from the beginning of system time. In most practical implementations of the illustrated infrastructure, the collection of the present and past calendar values (in short, the "calendar") will quickly grow too large to transmit in whole from the core down to the aggregator(s) each time a new calendar value is computed, although this might be implemented in some cases where the time between calendar values is high enough relative to the available bandwidth. In most cases, however, it is neither practical nor even necessary to do so. Instead, it will typically be preferable to transmit to aggregator(s) only the latest calendar value, whereby each aggregator maintains its own complete calendar. Note that this has the side advantage that full calendars may be maintained in multiple locations. Whenever a new aggregator is added to the infrastructure, the core could then transmit a complete calendar at set-up time, complemented by new calendar values as they are computed. Indeed, calendars may be maintained at any level in the infrastructure. This allows new aggregators, gateways and clients to join the infrastructure with minimal administrative burden and enables recomputation and authentication of any digital record without having to involve levels higher than the entity wishing to authenticate the digital record.

Important to note is that each calendar value in the calendar 6000 uniquely corresponds to a time, that is, to one of the time interval values $t0, t1, \ldots, tn$. Thus, as "real" time progresses, a new calendar value may be generated for each interval for all of the digital records that happen to be input for signature during that interval. Each calendar value therefore corresponds to time, inasmuch as the infrastructure cuts off new data record input and generates a calendar value at the end of each interval, but the length of the interval is a design choice; as such, calendar values will change at regular intervals (assuming the design choice of equal time intervals).

In most implementations of the authentication infrastructure shown in FIG. 1, digital input records will come from many different sources, may be of different types, and may be input into client systems that are widely separated physically, feeding upward into different gateway servers. Given the nature of proper hash functions, a change of even one bit in one digital input record will lead to a calendar value that is underivable from what it would have been without the bit change. In practice, therefore, as long as even one digital input record is input into the infrastructure in a following interval, the calendar value will be completely unknowable beforehand. As such, even though the calendar value is a result of deterministic computations, the value itself is non-deterministic, since its input parameters (the exact contents of future digital input records) are in practice unknowable. The preferred embodiment of this invention therefore uses the calendar values as indicators of "non-deterministic time" (NDT)—values that can be uniquely mapped to time, but that are not predictable time values.

Assume for simplicity and by way of example that the granularity of calendar time intervals is chosen to be 1.0 seconds. In other words, assume that a new calendar value is generated every second. If the time right now is 03:19:26, then one knows that the time 1, 10, or 10,000 seconds from now will be 03:19:27, 03:19:36 and 06:06:06, respectively. One cannot predict, however, what the infrastructure calendar value will be even one second from now, although one knows that the value will be generated at 03:19:27.

When the core computes the current calendar value 5001 at the new calendar time interval, it may return to aggregator 4010-1 its sibling (X-marked) lowest core node value from aggregator 4010-k, and the aggregator 4010-1 can then return downwards the X-marked hash values to the gateway 3010-2, which in turn can return downwards to the client 2010-1 all of the above, plus the X-marked hash values computed within that gateway's hash tree structure, etc. The data signature vector 8000 for each client can then be compiled for each data signature request (such as for each input record 2012), either in the client itself or in any entity (such as the associated gateway) that has all "sibling" values for a given input record.

Note that this arrangement makes it possible to distribute the hash computation infrastructure over various layers (vertically) and also "horizontally" at each layer, but the responsibility for communicating requests upward and partial or entire signature vectors downwards can also be distributed and can be carried out simultaneously in many different locations. Of course, since a data signature is unique to the digital record that led to it, the procedure for returning a signature vector for each input digital record 2012 for client 2010-1 (note that a single client may input more than one digital record for verification in each time interval) is preferably duplicated for all digital input records received in the time interval over which values were accumulated for the computation of node value 5001.

The configuration of the distributed infrastructure shown in FIG. 2 does not need to be static from one time interval to the next. Rather, each of the components below the core can be built asynchronously and independently of others; all that is needed for authenticating recomputation from a digital record up to the corresponding calendar value is the transformation function and other values that made up the original request, the vector of hash tree sibling values and knowledge of which hash functions are to be applied at each computation. Of course, the simplest case would be that the same hash function is used at every level. A somewhat more complicated choice would be to use the same hash function for all computations on a given level (within clients, within gateways, within aggregators, etc.) with variation between levels. Other even more complicated choices may of course be made as will be realized by those skilled in the art of such data structures and hash function computations. As long as the hash function used for each computation is known, the infrastructure will be able to validate a given input record.

In most cases, it is unlikely that the number of clients during a given computation interval will be exactly equal to a power of 2. Any known method may be used to adapt to the actual number of clients while still maintaining a binary hash tree structure throughout. As just one example of a solution to this, known dummy values may be used for all of the "missing" sibling node values. Alternatively, it is also possible to adjust the hash tree branches accordingly, in the manner of giving "byes" in single-elimination sports tournaments.

In one embodiment, the gateways 3000 may be more local to various clients whereas the aggregators are more regional. For example, it would be possible to locate aggregators in different parts of the world not only to distribute the workload, but also to increase throughput. Although it appears in FIGS. 1-3 that clients are associated with a particular gateway and gateways are associated with a particular aggregator, this is not necessary. Rather, client requests could be submitted over a network, and the first gateway that responds could then be associated with that client for that authentication transaction. Similarly, requests from gateways could be submitted to an open network and processed by whichever aggregator first establishes a connection. Locating aggregators and gateways both physically and logically in an efficient manner will therefore typically better distribute workload and reduce latency. This may not be desired in other implementations, however. For example, entities such as the government, defense contractors, or companies that wish to maintain strict security and tight control of the entire infrastructure could control and specify the relationship between all of the layers of the infrastructure, or any subset of these.

Assume now by way of example that some entity later wishes to verify that a digital record in question— a "candidate digital record"— is an identical copy of digital record 2012. Applying the same transformation function 2016 to the candidate digital record and recomputing upward using the corresponding data signature 8000, the entity should compute to the exact same calendar value that resulted from the original digital record's registration request. In some implementations, this level of verification is sufficient. As one possible example, if the calendar is distributed to enough independent aggregators, then if one malicious actor were to tamper with some calendar value, this could be detected if some procedure is implemented to compare with other copies of the same calendar.

As another example, in some implementations, users may choose or be obligated to rely on the security of the administrator of the core. In particular, government entities might implement a system in which users must simply rely on the government administrators. In these cases, recomputation up to the corresponding calendar value may be considered sufficiently reliable authentication. In the context of this infrastructure, this can be viewed as "first-level" verification. One hypothetical example of where such a system might be implemented would be where a government agency requires companies, laboratories, etc. to submit a copy of its calendar to the government entity every time the company's system updates its calendar. The government would then be able to audit the company's records and verify the authenticity of any given digital record by recomputing up to the proper calendar value, which the government will have stored. In practice, this would amount to requiring the company to keep updated a "calendar audit trail" with the auditing entity (such as the government).

Even in other instances, as long as the highest level system administrator trusts its ability to securely store calendars, it could be satisfied that a candidate digital record is authentic if recomputation leads to the appropriate stored calendar value. In a sense, it would be the system administrator itself in such cases that is looking for proof of the authenticity of candidate digital records as opposed to clients or other third-party entities. Consequently, the system administrator could trust the security of the recomputation and calendar values to the same extent it trusts itself to maintain the calendar copies.

All but the last digital record requesting registration in a calendar time period will typically need to wait for all other requests in the calendar time interval to be processed before a calendar value will be available that will enable authenticating recomputation. If the calendar time interval is kept short enough, this delay may be acceptable. To increase the level of security during the delay, it would also be possible to implement an option, whenever a client submits an authentication registration request, to generate and return not only the data signature vector but also a key-based signed certificate, which may be issued by any higher layer system such as the current gateway, aggregator, or even core.

Figure 4:
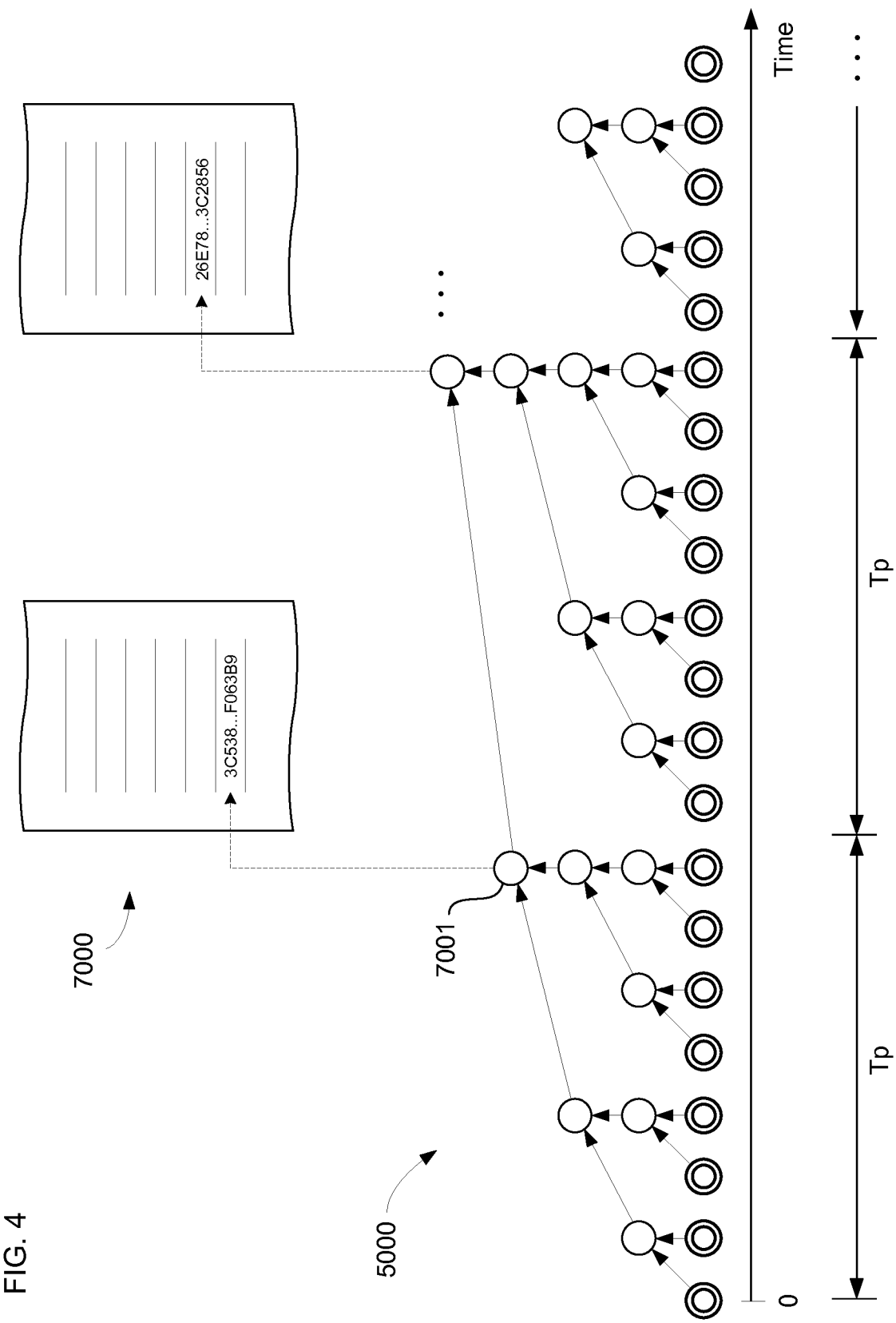
FIG. 4 illustrates publication to enable permanent, trust-free authentication.

FIG. 4 illustrates an extension of the basic calendar-reliant verification process that provides "second-level" verification that is a method for permanent verification with no need for keys or trust of any entity, not even the administrator of the core. In FIG. 4, all of the calendar values computed over a publication time interval Tp are themselves used as inputs to an additional hash tree structure that is preferably hashed together (for example, using a Merkle tree structure) with previous calendar values to compute a composite calendar value 7001 (a "publication value") that may then be submitted for publication in some medium 7000 such as a newspaper, online posting, etc., that forms an unchangeable record of the composite calendar value. Here, the term "unchangeable" means that it would be practically impossible for even the most malicious actor—even if this is the core administrator—to alter every publicly available occurrence of the value. It is not necessary for "published" to be in any medium accessible to the general public, although this is of course one option that removes all need for a trusted authority; rather, a large or perhaps closed organization that implements the entire infrastructure on its own might simply choose to keep a database or journal of the composite calendar values in some secure logical or physical location.

Because of the various data structures and procedures of the distributed infrastructure, the published composite calendar value may encode information obtained from every input digital record over the entire publication time interval, and if the current calendar value for the current calendar period is hashed together with the previous one, which is hashed with the one before it, and so on, as shown in FIG. 4, then each published composite calendar value will encode information from every digital record ever submitted for registration from the beginning of calendar time at to. This guarantees the integrity of the entire system: Changing even a single bit in a single digital record registered in the past will cause a different publication value to be computed, which would then not match the actual publication value. Once the composite signature value is published (that is, the publication value), there is never again any need to temporarily associate any signed digital certificate (which might be provided as before to increase security until the composite value is published, at which point it will not be needed) with the signature vector of the corresponding digital input record; rather, using the data signature vector and the calendar values (which are advantageously stored in each of the aggregators), one can then recompute hash values upward from any digital input record all the way to the published value. If the digital input record used in such recomputation leads to a match with the published value, then one can be certain to within the degree of certainty of the hash functions themselves that the digital input record being tested is identical to the one that originally received the corresponding signature vector.

Figure 5:
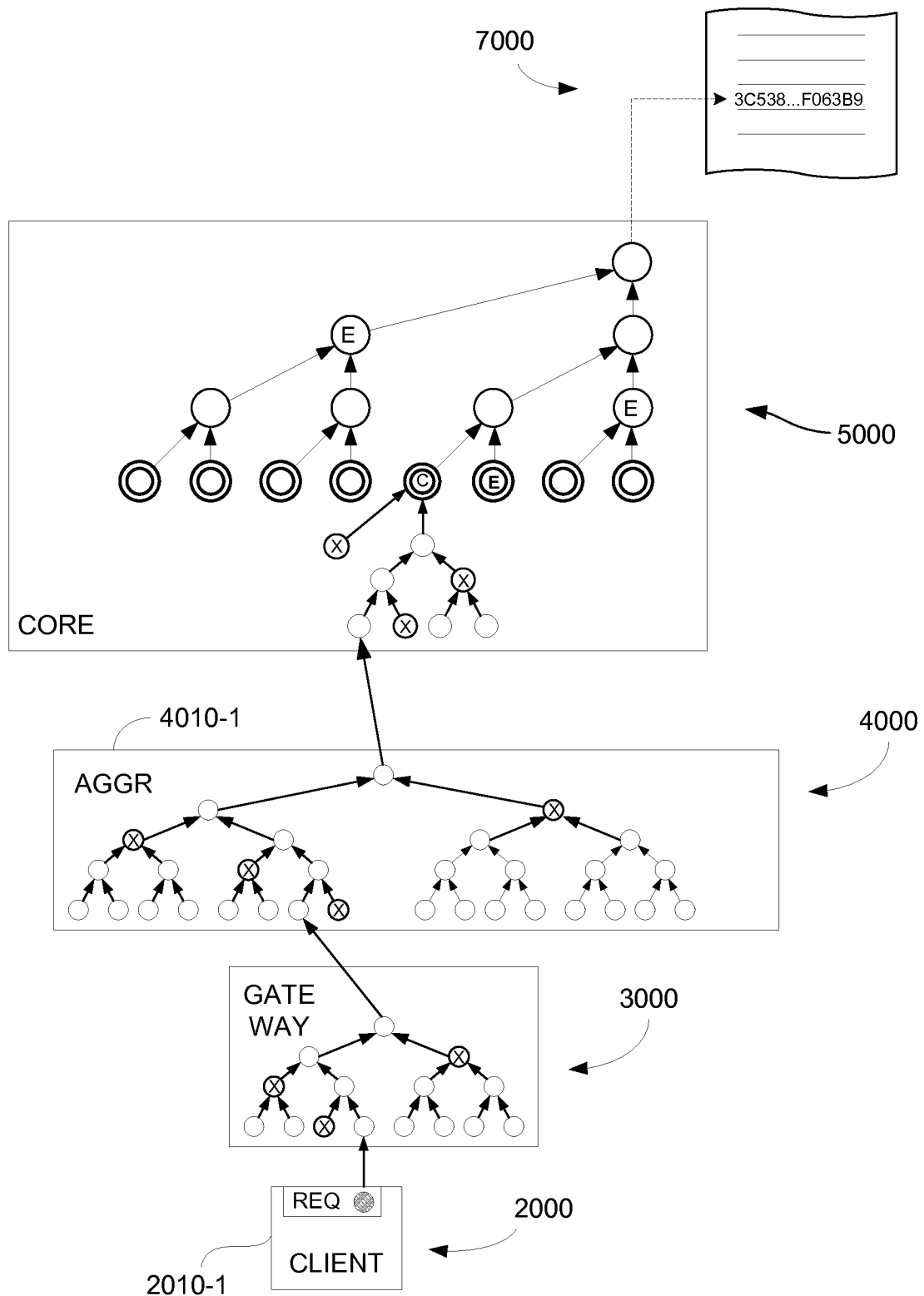
FIG. 5 illustrates use of a digital signature to enable system-independent authentication by recomputation.

FIG. 5 illustrates an optional extension of the signature vector to include the values obtained during computation of the publication value as well. Assume as before that the "X-marked" nodes are the sibling hash values for the digital record corresponding to the request REQ from client 2010-1. The X-marked values are sufficient to recompute the calendar value marked "C", but the hash values in the nodes marked "E" in the data structure (in FIG. 5, the Merkle tree structure) within the core that converts calendar values into the publication value are necessary to recompute all the way up to the published value 7000. Note that unless the current calendar value happens to be the last one in the current publication time interval Tp, then all of the sibling values in the core needed to recompute up to the published value will not yet be available when data signatures corresponding to the current calendar value are returned. The "extended sibling" values (illustrated as those marked with "E") may therefore be passed down to aggregators, and then further down through the different layers at the end of the publication time interval so that clients can complement their data signatures with the extended sibling values. At the end of the calendar period, the core thus preferably extends or augments the signature vectors to include the "E" values, along with corresponding order bits as previously. With such an extended signature, any party can verify the authenticity of a given digital record as long as it has the extended signature vector, knowledge of the hash (or other) functions used, and the corresponding publication value—if recomputation leads to a match, then the digital record must be identical to the original; if not, then something has been altered. Note also that any change of order in the time of receipt for any to digital input records will also affect the computed values in the core as well as the published composite signature value.

In FIG. 4, eight calendar values are shown in each publication time interval Tp. In other words, in the illustration, the number of calendar time intervals in each publication time interval Tp is conveniently a power of 2. This may not be so in other implementations, depending on the choice of intervals. For example, if a calendar value is generated each second, but publication occurs only once every week (604,800 seconds), then there will not be a power of 2 number of calendar values as leaf nodes of the Merkle tree structure. As in other trees, this can be handled in a known manner as in giving "byes" in single-elimination sports tournaments by adjusting the tree branches, by using "dummy" inputs, etc.

Although it may in many cases be desirable or even required for the published value to encode information from the entire calendar from the beginning of calendar time, other alternatives can also be implemented as long as suitable bookkeeping routines are included. For example, rather than include all calendar values in the Merkle tree, at each publication time all of the most recent calendar values could be included in the publication computation along with a random sampling of calendar values from previous intervals. This would be one way, for example, to ensure that the number of included calendar values is conveniently a power of 2.

Similarly, in some contexts, government authorities require proof of records extending back only for some given time such as three years. In such cases it might be advantageous always to include only calendar values generated during this required period such that only relevant digital records are encoded in the most recent publication value.

Another alternative would be for there to be only a single computation of the publication value, including all calendar values from the beginning of system time. This might be useful, for example, in projects with clear time or digital record limits. For example, in litigation or transactions, parties often submit digital records to a "data room" for easy exchange. Calendar values could then be generated periodically as in other cases (perhaps with a longer calendar time interval since digital records will generally not be submitted as frequently as in large-scale, universally accessible implementations of the infrastructure), but with only a single computation of a publication value when all parties agree to close the data room. The publication value would then be a form of "seal" on the body of submitted digital records, which could later be used for recomputation and verification of any digital record ever submitted into the data room.

It is not absolutely necessary for the publication value to be computed using the Merkle hash tree data structure illustrated in FIG. 4. One alternative might be, for example, that all calendar values over the publication time interval are concatenated and then hashed as a whole together with a pseudorandom number, which then becomes part of the extended data signature vectors.

It is not a requirement for systems in any given layer to apply the same hash functions. For example, the transformation functions used in different client systems could be different. As long as the functions at each place in the recomputation path are known to whoever later wants to authenticate a digital record through recomputation, the authentication process will work properly. Adding a hash function identifier as an input parameter to the preparation of the registration request would be one convenient way to enable future users to correctly authenticate a digital record through recomputation.

Non-Deterministic Time (NDT) Marking

Recall that the infrastructure shown in FIGS. 1-3 can generate a new calendar value Ci for each time interval ti. Let "ti" also indicate the time the interval "opens" (or closes—the same analysis applies to both). Given that the set of digital input records that will be presented in a future interval is essentially unknowable, this means that the values C(i+1), C(i+2), . . . are also unknowable, even if one knows at what times t(i+1), t(i+2), . . . they will be computed. Nonetheless, assuming the convenient design choice of a uniform time interval for calendar value calculations, there will be a unique correspondence between actual time and the time of generation of calendar values. Ci=C(ti). The Ci values thus correspond to time, and may be mapped uniquely to physical time, but they cannot be determined in advance. Each calendar value therefore represents a point in "calendar time", referred to here as "Non-Deterministic Time" or simply "NDT".

Figure 6:
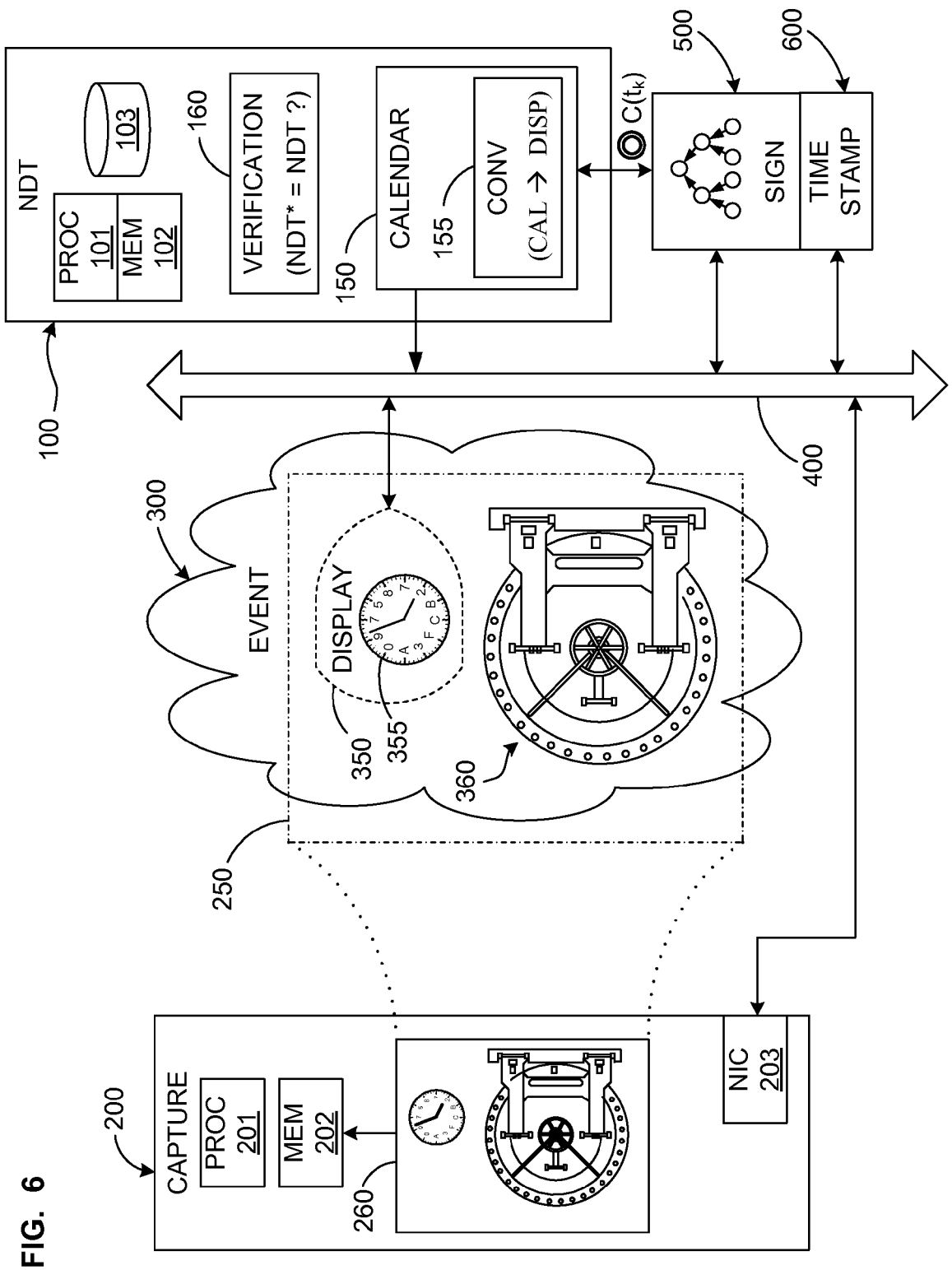
FIG. 6 illustrates the generation of non-deterministic time values and the incorporation of such a non-deterministic time value into a captured representation of an event.

See FIG. 6 and assume that some event 300 occurs. Simply by way of one of an essentially limitless number of examples, assume this event includes the closing of a bank vault door 360. As will become clearer below, the event may be visual, audible, a combination of both, or any other occurrence that can be recorded in some way and that one wishes to establish time for. A device 200 captures the event. For visual events, the capture device could be a camera (freestanding or incorporated into some other system such as a mobile phone), a video recorder, etc. If the event is (or is also) audible, the capture device will be some form of sound recorder, or the audio function of a video recorder, etc. Merely for the sake of simplicity, the main aspects of the invention are described below with reference to an embodiment in which a video device such as a camera captures a visual image; modifications to accommodate audio or audio-visual events will be apparent to skilled software engineers, or are discussed specifically.

Under the direction of a processor 201, the capture device 200 captures a framed portion 250 of the image of the event 300 and records it in digital and/or analog form internally as a corresponding image 260. In the case of digital capture, the image 260 will then typically be stored in a memory 202. Depending on the implementation, the capture device may also include a network interface device 203 and typically associated software so as to enable the capture device to access a network 400 and download data, as described further below.

Now assume that a display device 350 is also positioned within the image frame 250, that is, within the context of the event, and that it shows a representation 355 of the current NDT at the time when the image is captured. The displayed NDT representation 355 will then be part of the recorded image 260. In other words, in the illustrated example, the "photo" of the closed vault door will include a visual representation of NDT at the time the photo was taken. In the time-stamping example described above, one would be able to take the photo, then edit it, and then time-stamp the edited image—the time stamp at the later time would not prove that such forward-dating didn't occur. With the NDT representation in the image, however, the image itself includes visual information that shows the image could not have been created before the included displayed NDT value was available. Since NDT values cannot be predicted in advance, it will be exceptionally difficult to forward-date such an image.

In many cases, one will also want to rule out back-dating as well, at least as well as possible. One way to accomplish this would be for the capture device 200, using known techniques, to obtain a conventional digital time-stamp for the image 260, for example, by accessing a time-stamping server 600 over a network 400.

FIG. 6 illustrates only one capture device 200, one event 300, and one display 350. This is merely for the sake of illustration. In most implementations of the invention, there may be any number of capture devices imaging any number of events, with any desired configuration of displays. Indeed, in the cases where the event is changing and the capture device is a video recorder, each frame of video may be considered to represent a different event, with the display changing during recording.

As FIG. 6 shows, the NDT values shown by the display 350 may be provided by an NDT system 100, which will typically be a network-accessible server or similar processing system. In some implementations, the various instances of the display 350 (which may take different forms) may be considered as part of the NDT system 100 itself, although the NDT values may also be distributed to any entity that wishes to display them. The NDT system 100 will include conventional operating components such as a processor 101, memory 102 and storage 103, all or some of which may be local or remote, such as in the "cloud". A calendar module 150 is included that either is or in turn includes a conversion module 155 that converts calendar values into a form for display in a chosen format. Some of the many possible examples of such conversion are given below.

The calendar module 150 communicates in any known manner, such as over a dedicated connection or via the network 400, with the system 500 that generates calendar values Ck=C($t_k$). In one embodiment, the system 500 is the distributed hash tree infrastructure shown in FIGS. 1 and 2.

If time-stamping is also included as a feature in a chosen implementation of the invention, the time-stamp server 600, may, but need not be, implemented on a separate system from the data signature infrastructure; rather, it could be part of a single overall signing and stamping service. One advantage of this would be that it would be easy to ensure a common, synchronized time base for both components.

It is also possible to implement the NDT system 100 as part of the signature infrastructure itself, such as a processing component in the same server as the core, although it will typically not be involved in the data signature process as such. In such a case, at each time interval $t_k$, or on demand, the NDT system 100 thus may obtain from the signature infrastructure 500 the corresponding calendar value, which in turn corresponds to the current NDT. It then passes this value to the display device 350, either automatically, as each new calendar value is generated, or on demand, depending on the particular implementation of the display 350.

In some implementations, the entire string representing the calendar value can be included in a digital photo or audio file, such as where the data-capture hardware and software automatically superimpose the string onto or into the corresponding digital file before initial storage and in such a way that the user cannot disable or post-process it in.

Figure 7:
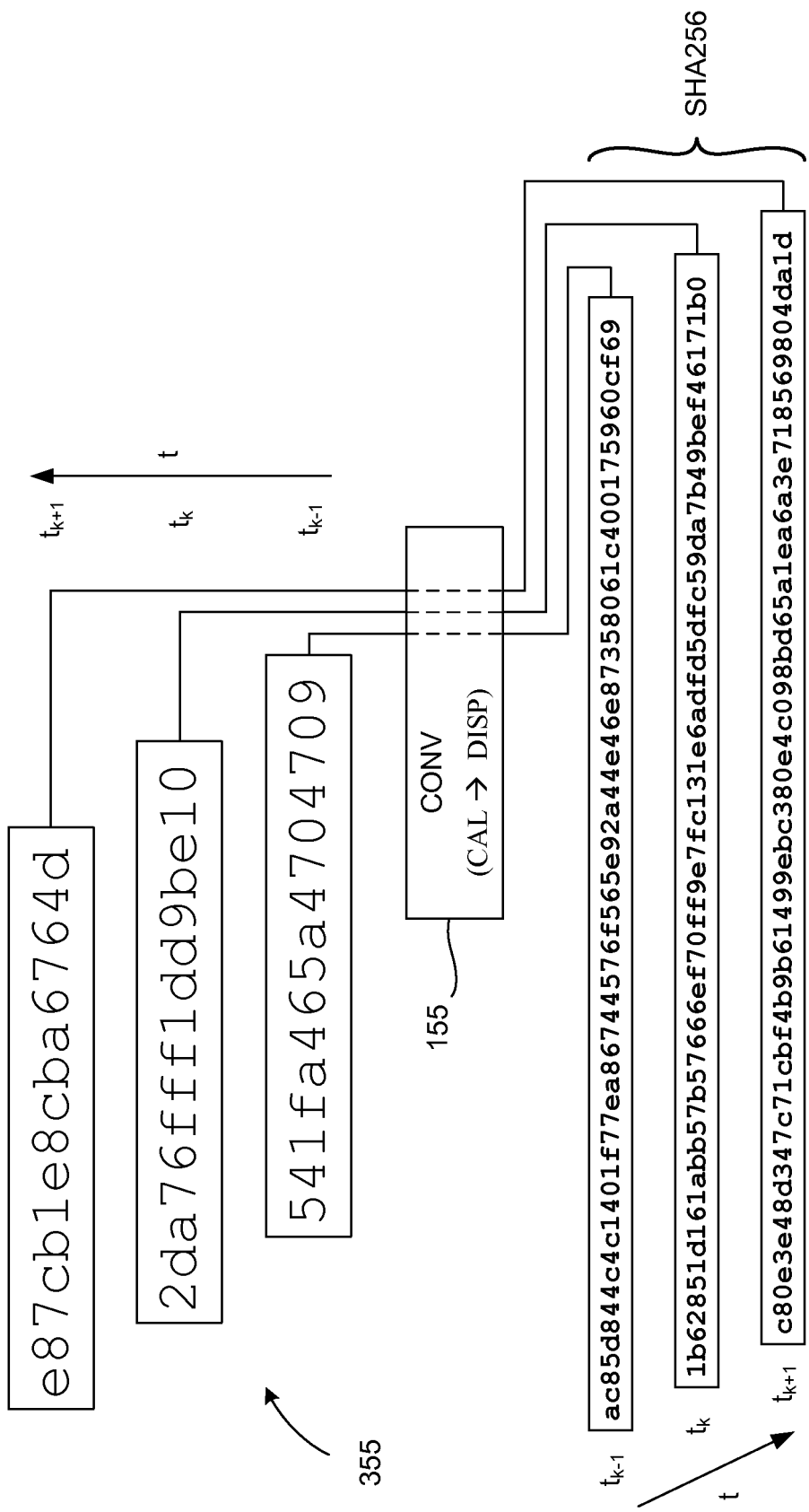
FIGS. 7-11 illustrate various examples of possible representations of non-deterministic time values that can be associated with captured representations of events.

In most cases, however, a typical calendar value $C(t_k)$ will comprise a data string so long that it may be impractical to display it all to capture devices. For example, using the SHA-256 hash function to generate the calendar values $t_{k-1}$, $t_k$, and $t_{k+1}$, and representing them in hexadecimal, would create 64-digit values. Including such a value in a public display device would in most cases be unwieldy, and many cameras would not even be able to resolve all the digits adequately except under excellent conditions, if then. FIG. 7 illustrates examples of three calendar values generated using SHA-256 hashing at times $t_{k-1}$, $t_k$, and $t_{k+1}$, each comprising 64 hexadecimal digits. In this example, the conversion module 155 reduces each calendar value to a 16 hex-digit NDT value simply by choosing every 4$^{th}$ hexadecimal digit. Other functions may of course be used instead, including additional hashing of the calendar value itself, by creating an m-digit check sum (where m is less than the number of digits in the full calendar value), etc. Given the essentially random nature of SHA values, another simple choice would be just to use the first 16 digits (or how many ever are needed) of the calendar value. The reduced values may then be passed to the display unit 350 for sequential display.

Other representations of the calendar values could also be displayed, depending on the type of display device used. For example, a pattern of lights around the display device could indicate some subset of the binary digits of each calendar value as NDT values. In implementations where the display is, for example, itself a form of video, such as a television, computer monitor, etc., the NDT values could also be encoded directly in the video stream, or as part of the task bar, wallpaper or screen saver of a computer monitor, or as a portion of the display of some running application that itself is being monitored by video.

Figure 8:
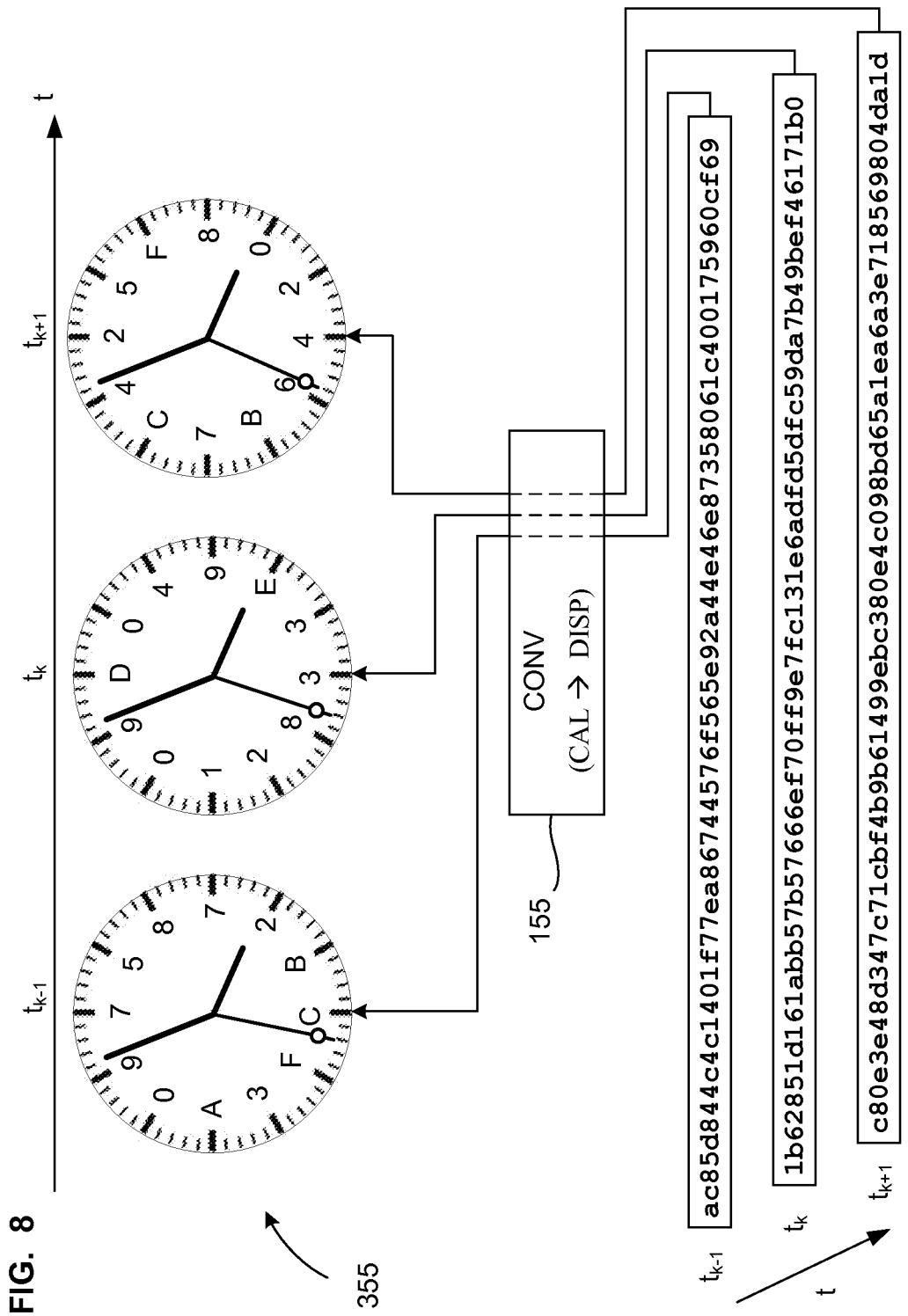

FIG. 8 illustrates another example of a display, which includes both real time and NDT. In this example, the conversion module 155 reduces the calendar values to twelve hex-digit NDT values, for example, by applying a 64-to-12 hex digit hash or other function, or by digit selection, etc., or simply just taking the first/last/etc. 12 hex digits. The digits of the NDT value are here displayed in the twelve hour markers of a conventional analog clock face. For example, at the physical time $t_k$=04:56:33, the non-deterministic time is D049E3382109. At the next physical time, $t_{k+1}$=04:56:34, the NDT is 25F80246B7C4, and so on, with the NDT changing every second. A photograph that includes such a clock face would therefore show not only apparent real time, but also the corresponding NDT.

Figure 9:
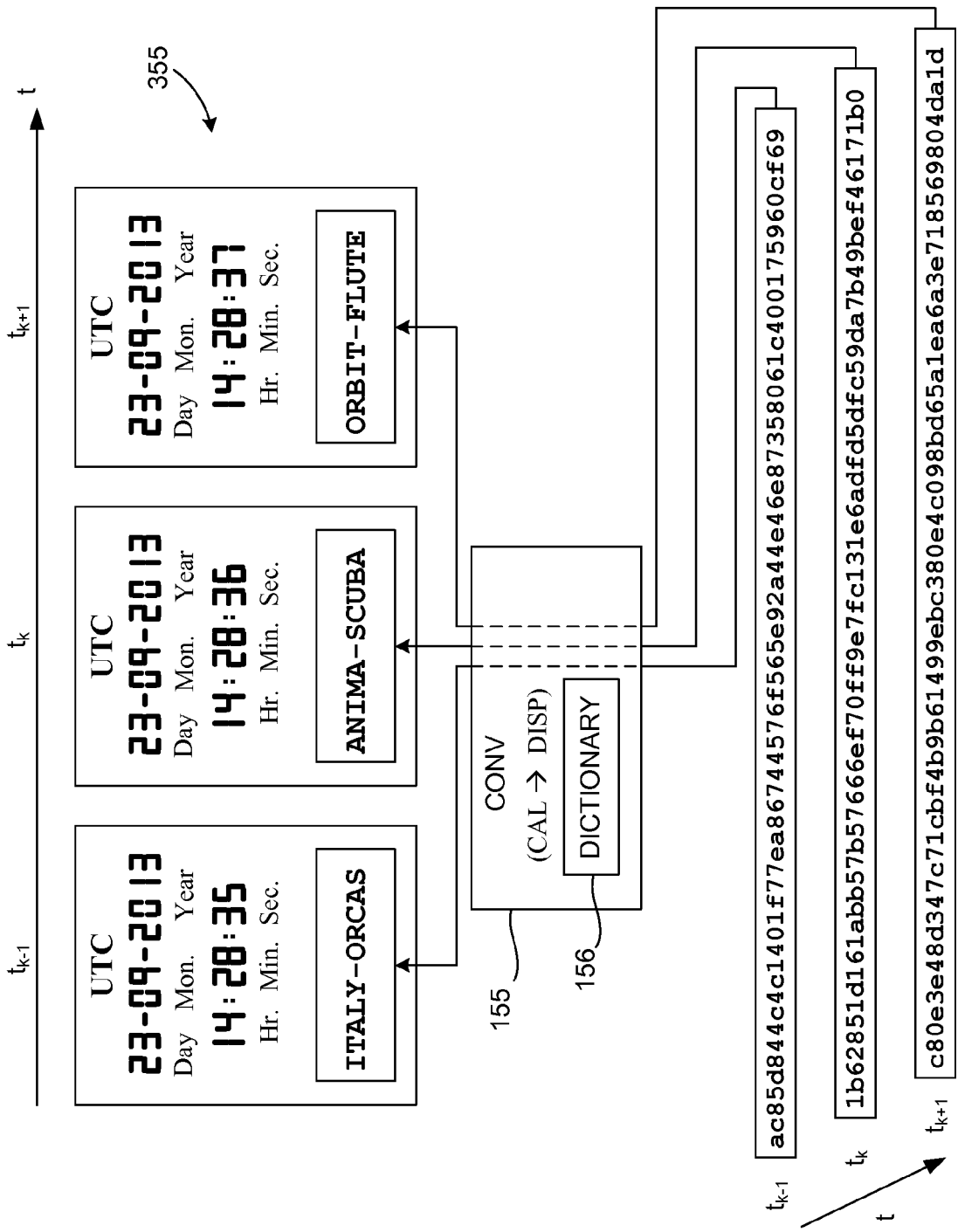

FIG. 9 illustrates a "verbal display" in which NDT values are displayed as more readily legible words instead of digits. In this example, the conversion module 155 includes a dictionary 156. In this embodiment, calendar values are used to index or hash into the dictionary to select, in the illustrated case, two words, which are then displayed as the NDT values. For example, the calendar value at $t_{k-1}$ is thus converted to the NDT value "ITALY-ORCAS", which is displayed along with the UTC date (shown as 23-09-2013) and time (shown as 14:28:35). There are many ways to index into a dictionary, and any number of words could be displayed, including only one. For example, assume the dictionary includes $2^8$=256 entries of five-letter words. (Five letters is of course only one example—words of any length could be used and the length need not be uniform. Similarly, the dictionary could include any number of words, requiring only an adjustment in the number of bit/digits used to index into it.) The calendar value can then be reduced to two 8-bit (one byte) segments, with each segment pointing to an address and therefore word in the dictionary, which is then displayed. The number of possible display word combinations (allowing for duplicated words in the display) would then be $2^8 \cdot 2^8 = 2^{16}$=65,536, which would make it difficult for even a sophisticated user to "pre-generate" all possibilities, even if he knew all the words in the dictionary, tamper with the recording (video or audio) and insert, by editing in, the "correct" NDT value, all within the given NDT time interval. To further prevent attempts at value prediction, the entries in the dictionary 156 could be changed from time to time; as long as the dictionary contents at past times are stored, it will always be possible to confirm correct word pairs.

The dictionary could also be organized according to parts of speech, such that different subsets of the calendar values are used to index into different portions of the dictionary, such that, for example, the first word used in the NDT is an adjective, the second is a noun, the third is a verb, and so on, such that NDT values are represented as syntactically correct sentences.

It is not necessary for the verbal NDT presentation 355 to be in alphanumeric characters—with simple modification well within the skill of system programmers, representations or identifiers of ideographs such as Chinese characters could also be used in the NDT display 355, or stored in the dictionary. Other non-Latin-based alphabets (such as Cyrillic, Arabic, etc.) could also be displayed, as well as syllabaries such as Japanese kana.

This verbal embodiment could be used for audio display too: Assume that the capture device 200 is, or includes, sound recording. Instead of, or in addition to, visually displayed words, the display words could be presented as audio files so that they are "pronounced" and included as part of the audio recording. In such a case, it is preferable to keep the verbal display words short or few enough for it to be possible to pronounce all the included word(s) for the current NDT before a new NDT is generated. To avoid unnecessary disturbance with the intended audio recording, it would also be possible to compress the audio file so as to pronounce the display words very rapidly—the information would still be available for decoding and later verification.

Yet another alternative of the verbal presentation of NDT values could be an oral presentation. For example, an announcer, video conference participant, etc., at some point (s) (such as the beginning and/or end) of an audio and/or video recording, broadcast or other presentation, could speak the word(s) that represent the current NDT, which he could obtain in any preferred manner, such as from a dedicated display in the recording device or in the room/studio, from a website that displays NDT, from a dedicated NDT clock display device, etc.

Figure 10:
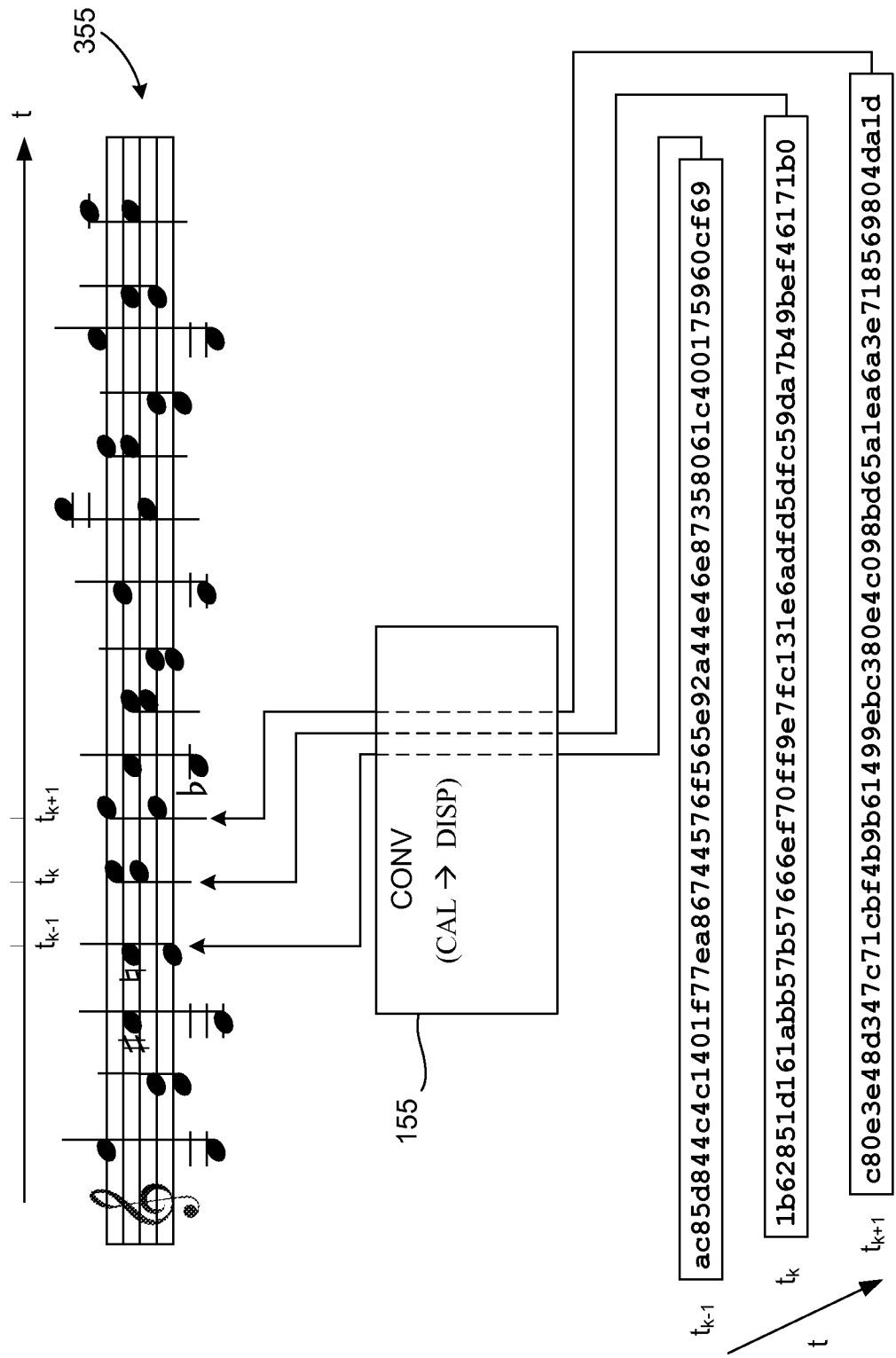

FIG. 10 illustrates a different audio display possibility: In this case, the calendar values are reduced and converted into a musical "chord" at each time interval, for example, as an audio file in any chosen audio format, such as MIDI, .wav., .mp3, etc., or simply as values that the display 350 itself converts to notes. In the illustrated example, two different tones (shown as musical notes) are generated as a "chord" to represent each NDT at each time, although of course more tones could be included. Even with only two different tones per NDT value, and assuming the notes are chosen (as just one example) from a set of 64 (a power of two, for easy indexing into, for example, a table of tone values, or inclusion as parameters in a tone-generating function) of the 88 notes in the range of a standard piano keyboard, there would be 2,016 different possible combinations to be representations of NDT. Adding a third different tone per NDT value would allow for 41,664 combinations.

The "chords" would not need to be "played" throughout the time interval on the audio recording of the capture device, but each could be presented as a sound "burst" at some time during the current time interval to reduce interference with the primary audio recording.

Figure 11:
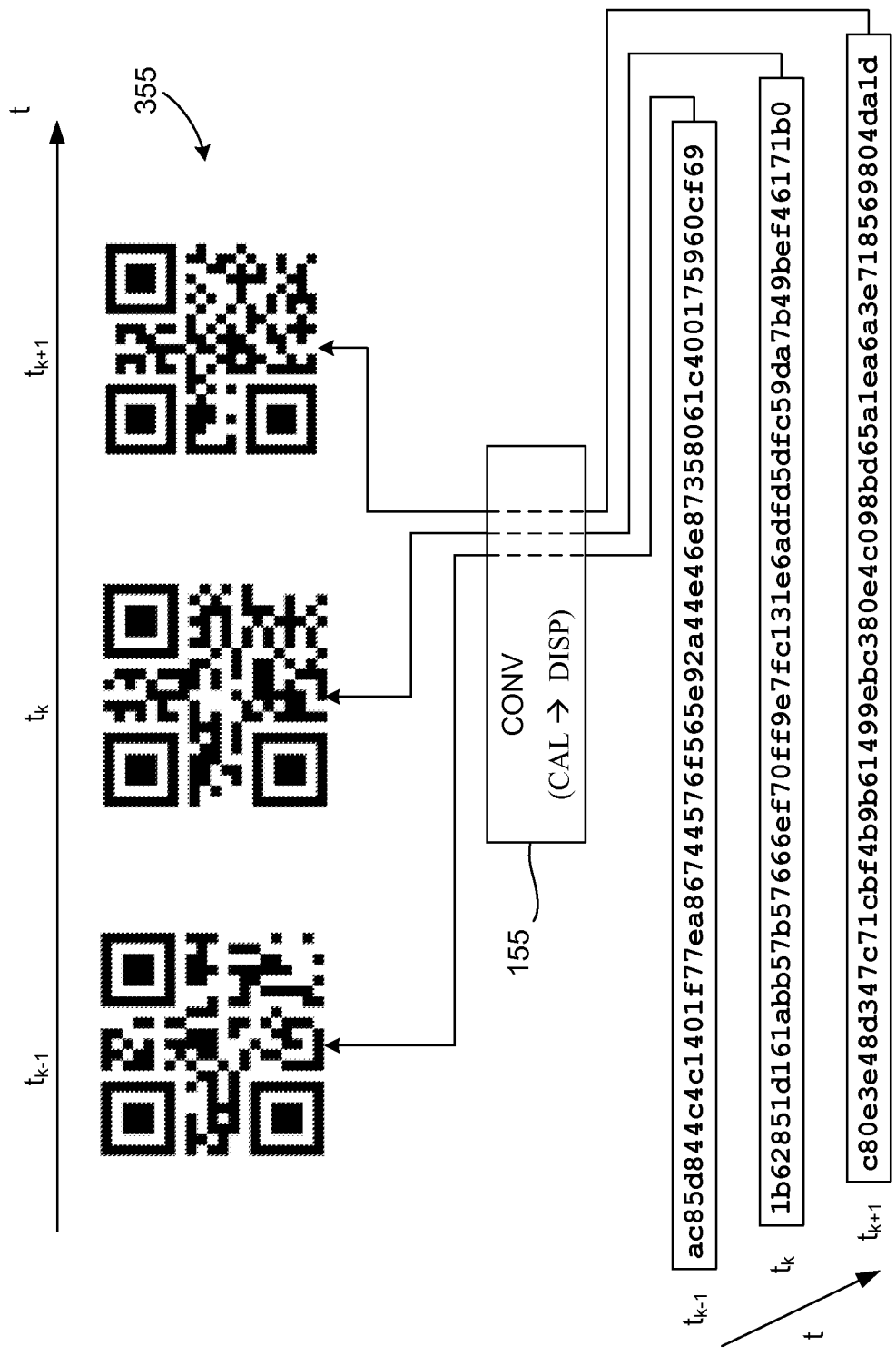

As FIG. 11 illustrates, it's not necessary for the display of NDT values to be directly legible to users, but rather may be primarily machine-readable. In the illustrated example, the NDT values shown in FIG. 7 are presented not in alphanumeric form, but rather as corresponding QR codes. Of course, other machine-readable codes could be used, such as any one- or two-dimensional bar codes. If such optically decodable symbols are used to encode NDT, it would also be possible to include other information as well. Just a few examples would be actual time values, administrative information, random numbers (adding an additional aspect to NDT, as indicated below), an identifier of the display device, etc.

In the embodiments illustrated in FIGS. 7-11, NDT values are presented to the capture device 200 in either visual or audio form, and may include both. It would also be possible, however, not to include any audio-visual display at all. For example, the capture device could download NDT values directly from the NDT system 100 and incorporate them into the stored images 260, for example, in the form of superimposed digital watermarks, although, as mentioned above, this should preferably be done directly and automatically at the time of digital image creation by the capture hardware and software, before initial image storage, so as to reduce the chance that the user can post-process the image to include a false NDT value. One disadvantage of this embodiment, however, is that a visual display of NDT available publicly will often appear more credible; moreover, such a watermarking embodiment might simply raise the question of the reliability of the hardware and software that added the watermark. Nonetheless, this is one design choice.

Now assume that the purported time of recording (visual, audio or both) of an event is later to be checked. For example, assume that a photograph is presented and purported to have been made at a specific physical time. If an NDT value is present in the photograph, the NDT system 100 can be queried, with a purported NDT value NDT* and the purported event time tp—either manually or automatically—so that a verification module 160 can compare NDT* with the NDT value that was actually generated at the purported event time. If NDT*≠NDT(tp), then the system may return an indication that the photograph is not time-verified. If NDT*=NDT(tp) the NDT system may return an indication of at least probable NDT time verification to within the level of certainty allowed by the probability of "NDT value duplication" (see below). The data signature and time stamp values may also be submitted for verification by the respective entities, with results returned in whatever manner has been implemented.

Given an NDT value, the system will be able to determine the corresponding real, physical time in different ways. One way would be to maintain a data base of NDT values as a function of time, or vice versa. In systems whose time interval is, for example, 1.0 s, this would require storage of approximately 31.6 million NDT (or calendar) entries per year. Another way would be to query the system within the data signing infrastructure 500 that maintains the calendar 6000 with the purported time of occurrence of the event. The corresponding calendar value should then compute to the same NDT as recorded by the capture device, again, to within a degree of certainty that is a function of the probability of NDT value duplication.

The term "NDT value duplication" as used here refers to the fact that, in most cases, although NDT may be a function of calendar time, calendar time may not necessarily be a unique inverse function of NDT. Consider the example above, relating to FIG. 9, in which calendar time is mapped to two 256-member sets of words, that is, to one of $2^{16}$=65536 possible word pairs. Obviously, after no more than 65536 calendar time intervals, there must be at least one repeated NDT value, which means, at that point, without additional information, it will be impossible to unambiguously determine tp given that NDT(tp) value. If calendar values are generated, for example, every 1.0 s, this means there must be at least one duplicated NDT value every approximately 18.2 hours.

One way to reduce the probability of NDT value duplication is to increase the set of possible NDT representations of calendar values. Continuing with the example shown in FIG. 9, the number of words in each word set could be increased, or the number of words used in the NDT representation could be increased. Even then, as long as the set of possible NDT values is less than the set of possible calendar values itself, there will still be at least some risk of NDT value duplication.

In most practical cases, however, the probability of NDT value duplication can be chosen to be sufficiently low as to provide an acceptable level of assurance that forward-dating has not occurred. For example, even with only 65536 possible NDT word pairs, it would still be very difficult for a user to predict which word pair will be the correct one at a given future time, especially since the pairs will occur essentially randomly and there is no guarantee that any given word pair will re-occur even within 18.2 hours. Of course, if one were to include $2^{12}$=4096 words in the dictionary instead, and three words are included in each NDT representation, a duplicate of at least one NDT value (not necessarily of a given NDT value) would be certain only after about 2177 years, if a calendar value is generated every 1.0 seconds. A similar analysis will of course apply to other ways of representing NDT values.

Moreover, in case of a recording spanning several NDT intervals, the difficulty of guessing the sequence of NDT values increases exponentially compared to the difficulty of guessing just one NDT value. For example, with $2^{16}$=65,536 possible NDT word pairs, the number of sequences spanning two NDT periods is $65536^2$=$2^{32}$=4,294,967,296, the number of sequences spanning three NDT periods is $65536^3$=$2^{48}$=281,474,976,710,656, and so on.

Of course, a way to avoid the problem of NDT value duplication is simply to have a unique one-to-one mapping between calendar values and their representations, the most straightforward of which would be to display or use the calendar values themselves.

Although it would require additional modification of the internal code of the capture device, one alternative would be to require a data signature for each captured image before it is stored in any memory device 202 that is easily accessible by any user; for example, each captured image could be buffered by the processor 201 and submitted as a digital input record from the buffer, and then stored to memory only when the signature is received. The code that controls the operation of the capture device 200 may be modified by skilled programmers to perform these functions. All of these additional measures increase the believability (and therefore, for example, credibility as evidence) of an image presented as having been created at a given time.

As mentioned, the data set (such as an image, audio recording, etc.) that incorporates an NDT representation may itself form an input to a signing infrastructure such as the one illustrated in FIGS. 1-5. In such cases, because each calendar value is generated only at the end of a corresponding time period (since the infrastructure needs the input from all digital records requesting signatures in a current calendar interval), the incorporated NDT value will typically be at least one period "behind" the calendar value that the data set itself contributes to. In most practical cases, time determination to within the granularity of one or only a few calendar periods (for example, one second) will be acceptable for evidentiary purposes. Note moreover that if the data signature also includes physical/clock time, then this portion of the signature itself may also function as a conventional time stamp, eliminating the need for a separate time stamp.

Note that different embodiments represent different levels of security, but also different degrees of implementation complexity:

Imaging/recording NDT only as part of the event capture—This requires no modification of the capture device itself. For example, photographing a NDT display along with an event involves only devices and processes external to the capture device, which could be an off-the-shelf camera or standard built-in camera in a smart phone, etc. In many cases, this will be sufficiently reliable, and in any case will be more difficult to defeat than simply relying on user-adjustable date-time settings, other forms of court testimony, etc. Although inclusion of NDT in the image will defeat attempts at forward-dating, it doesn't prove absence of back-dating, as the past NDT values would be available to be displayed in the NDT clock by a knowledgeable forger.

NDT-imaging+time-stamping—This embodiment provides a safeguard against both forward-dating and backward-dating, but requires modification of the capture device to enable real-time access to an external time-stamping service. Such external access and downloading of the time stamp will in many cases be relatively easy, for example where the capture device is incorporated into a network-enabled mobile phone, but would be more difficult and typically require modification of a stand-alone camera or audio recorder.

NDT-imaging+data-signing—This embodiment also requires modification of commodity capture devices to submit each recorded image as a digital input record to the data-signing system 500 and to receive the associated data signature. This embodiment may also include time-stamping. As mentioned above, the data signature returned by the infrastructure illustrated in FIGS. 1-5 may itself include physical/clock (such as UTC) time information and therefore itself serve as a time stamp.

The embodiments described above are primarily fully automated in the sense of requiring little or no human activity other than, in some implementations, operating a camera, audio recorder, or other capture device. These offer different levels of difficulty of defeat by sophisticated fakers. One embodiment that would be exceptionally difficult to defeat would involve at least one human as part of the "display" 350: Possibly along with other text or statements, assume the capture device is a video camera that films and audio-records a human who speaks the representation of NDT as it occurs—it would be practically impossible for all but the most sophisticated image editors to tamper with the video frames fast enough to maintain consistent NDT values and time stamps.

Calendar values of the distributed hash tree infrastructure shown in FIGS. 1-3 are not the only forms of "non-real", that is, non-physical time that could be envisioned. For example, it would possible to generate random numbers and use those instead of hash calendar-derived NDT values. One disadvantage of random numbers, however, is that one must then trust that the central provider's numbers truly are random. If the numbers aren't derived from a truly random source such as measurements of a chaotic physical phenomenon such as thermal noise, electronic noise such as from back-biased diode junctions, quantum occurrences, etc., then the "random" numbers will result from some algorithm, which is not truly random and non-deterministic: Most algorithmically produced random numbers are random in the sense that they display a desired probability distribution, but in many cases number $R(n+1)$ is a deterministic combination of some set of the numbers $R(0), \ldots, R(n)$. Even if algorithmically generated [pseudo-]random numbers do display sufficiently great unpredictability, there is still the concern that the underlying algorithm is embodied in executable code under the control of some administrator, whom one must then trust.

Indeed, this is a concern even when the numbers are generated according to a method that is supposedly cryptographically secure, such as the Dual Elliptic Curve Deterministic Random Bit Generator (Dual_EC_DRBG). The Dual_EC_DRBG, previously promoted by the U.S. National Institute of Standards and Technology (NIST), was soon afterward shown (by, among others, Dan Shumow and Niels Ferguson) to display a vulnerability that could function as a back door. In fact, others have suggested (see New York Times, 10 Sep. 2013, "Government Announces Steps to Restore Confidence on Encryption Standards") that the Dual_EC_DRBG may deliberately have been designed to include such a back door.

NDT values derived from hash-derived calendar values, in contrast, have the advantage of being tied to verifiable external events, that is, the input of a set of incoming documents, which can be proven to be non-faked by recomputation of any of the documents back up to a given calendar value, or even publication value as shown in FIGS. 4 and 5; despite such post facto verifiability, however, calendar values are still non-deterministic in that it will in general be impossible to predict the exact set and order of bits in every digital input record to the distributed hash tree infrastructure during any given calendar period, especially when the infrastructure inputs records from unrelated sources. From the perspective of an observer, or even of one doing a statistical analysis, calendar values (or uppermost hash values 7001 in the core, whether at the end of a publication period or not—see below), and thus NDT values, will appear to be as "random" as numbers that are deliberately intended to be random/pseudo-random numbers.

Consequently, one alternative use of the technique described for creating NDT values would be to use them as [pseudo]-random numbers, regardless of whether they also are used to verify the time of an event in an image or other file. The distributed hash tree infrastructure would therefore have the "side benefit" of also functioning as a form of unpredictable, non-deterministic number generator that could make calendar or NDT values or composite calendar values available (including as an NDT display, as long as it includes a desired number of digits). Even if calendar values are not displayed as such non-deterministic numbers, those desiring reliably non-deterministic numbers could simply submit a file as an input record to the distributed hash tree infrastructure and then use the resulting, returned calendar value instead of an otherwise generated [pseudo]-random number. Users of such a number generator would not need to worry, or at least as much, about the integrity of the generation algorithm, or about reliance on a chaotic physical source, etc.

As system designers will understand, the various computational modules within NDT system 100 and the capture device 200 comprise computer-executable instructions that may be provided from any known computer-readable storage medium, including downloading the code over a network into memory or other storage units, on physical media such as CD-ROM or other disks, on optical or magnetic storage media, on flash or other RAM-based memory devices, etc. This code may then be loaded into storage and/or memory and executed by the respective processors to implement the various processes that enable the invention as described above.

NDT as Function of Composite Calendar Values

In the embodiments described above, NDT values are computed as functions (including the identity function) of current calendar values $Ck=C(t_k)$. The distributed hash tree infrastructure offers alternatives to this choice. Refer again to FIG.

4, in which the composite calendar values 7001 are shown as being computed at the end of each publication time period Tp, which is appropriate for creating the value in the publication medium 7000. It is not necessary to wait until the end of a publication period to generate an upper-most, composite calendar value, however; instead, the system can compute an uppermost composite calendar value as often as every time a new calendar value is generated, such as every second. Especially if the core 5000 uses a data structure such as the Merkle tree structure, or a hash chain, etc., then the core may augment the tree at each calendar period (or predetermined plurality of calendar periods) with the calendar value(s) generated up to that period and not already included in the data structure, so as to generate an uppermost hash structure value, for example, every time a new calendar value is available. At the end of the publication period, the uppermost hash structure value will then be the publication value.

Note that, in this embodiment, each NDT value would encode information found not only in the corresponding current calendar value, but also information from all previous calendar values included in the uppermost hash structure value. This increases the protection against a flooding attack, since an attacker, wishing to forward-date, would need to control every other input to the infrastructure not only in a current calendar period (which is nearly impossible as is for a widely used system), but for all calendar periods up until the time he wishes to forward-date.

Generalized NDT Applications

In most of the examples given above, NDT is presented visually and/or or audibly. Other applications are possible, however. Indeed, NDT may be used substantially in any application or situation where some form of time notation is desired and that does not necessarily have to be standard clock time, especially where the evidentiary value of non-determinism (that is, non-predictability) can be advantageous. As just a few of the essentially countless examples, NDT could be associated with automated events such as a computerized transactions or internal computer events, stock exchange trades (to help disprove insider trading, for example) the creation, modification, transmission or receipt of data files, state changes of machines or manufacturing processes, print-outs of invoices, receipts or delivery notices, etc.

The display device 350 need not be fixed. Rather any device capable of accessing the NDT system 100 could be designed to obtain and display NDT, thus forming an "NDT clock". Smart phones and other mobile devices, computers of all types, watches (many of which are already internet-enabled), "augmented reality" display devices such as Google Glass, etc., could all be designed to make NDT available to a user, who could then, for example, manually record the current NDT for whatever desired purpose, or to computer hardware or software components instead of or in addition to physical clock time. NDT could also be represented as a kind of "non-deterministic time zone" as an option in such devices. If implemented as a clock that is viewed by a user, any desired NDT representation may be used, such as those illustrated as the representations 355 in the figures.

As just one example, the face of an "NDT watch" could be configured as shown in FIG. 8 to show both physical time and NDT. If one-second updates are not needed or desired (since it may not give a user time to write them down or read them off), it would also be possible to update NDT at some other interval, such as each minute.

We claim:

1. A method for authenticating the time of occurrence of an event, comprising:

generating non-deterministic time (NDT) values corresponding to respective physical times,
wherein generating NDT values comprises generating each NDT value as a function of a corresponding calendar value computed at a respective physical calendar time as a root hash value of a distributed hash tree infrastructure having as input nodes a plurality of digital input records during a respective calendar interval;
transferring the NDT values for sequential display by a display device located within a context of the event, such that a recording of the event at an actual physical recording time will include a representation of the then currently displayed NDT value; and
in a subsequent verification phase, comparing a presented NDT value with the one of the NDT values that corresponds to the actual physical recording time, whereby inequality of the presented NDT value with the NDT value that corresponds to the actual physical recording time indicates that the purported physical recording time is not the same as the actual physical recording time.

2. A method as in claim 1, further comprising submitting the recording of the event together with the corresponding NDT value as one of the digital input records to the distributed hash tree infrastructure and associating with the recording of the event a corresponding computed data signature.

3. A method as in claim 1, comprising generating each NDT value as a function of a sub-set of the digits in the corresponding calendar value.

4. A method as in claim 1, in which the recording of the event is in a visual format, the display of the NDT values by the display device is visual, and the display is combined with a representation of physical time.

5. A method as in claim 1, further comprising generating and representing the NDT values for display verbally.

6. A method as in claim 5, further comprising generating the NDT values as respective sets of words selected from a dictionary.

7. A method as in claim 5, in which the NDT values are presented orally.

8. A method as in claim 1, further comprising generating and representing the NDT values for audible presentation as the display.

9. A method as in claim 1, further comprising time-stamping the recording of the event.

10. A system for authenticating the time of occurrence of an event, comprising:

a central processing system including software modules:
for generating non-deterministic time (NDT) values corresponding to respective physical times,
wherein generating NDT values comprises generating each NDT value as a function of a corresponding calendar value computed at a respective physical calendar time as a root hash value of a distributed hash tree infrastructure having as input nodes a plurality of digital input records during a respective calendar interval;
for transferring the NDT values for sequential display by a display device located within a context of the event, such that a recording of the event at an actual physical recording time will include a representation of the then currently displayed NDT value; and
a software verification module provided, in a subsequent verification phase, for comparing a presented NDT value with the one of the NDT values that corresponds to the actual physical recording time, whereby inequality of the presented NDT value with the NDT value that corresponds to the actual physical recording time indicates that the purported physical recording time is not the same as the actual physical recording time.

11. A system as in claim 10, in which:
the central processing system is configured to receive the recording of the event;
the calendar module is further provided to submit the recording of the event together with the corresponding NDT value as one of the digital input records to the distributed hash tree infrastructure and associating with the recording of the event a corresponding computed data signature.

12. A system as in claim 10, further comprising a conversion module for generating each NDT value as a function of a sub-set of the digits of the corresponding calendar value.

13. A system as in claim 12, in which the conversion module is provided for creating the NDT value as a verbal representation of the corresponding calendar value.

14. A system as in claim 13, in which the conversion module includes a dictionary.

15. A system as in claim 10, in which the recording of the event is in a visual format, the display of the NDT values by the display device is a visual NDT representation combined with a representation of physical time.

16. A system as in claim 10, in which the central processing system including is further provided for inputting a time-stamp of the recording of the event.

17. A non-transitory computer-readable storage medium having data stored therein representing software executable by a computer, the software including instructions enabling authentication of digital records, the storage medium comprising:
instructions for generating non-deterministic time (NDT) values corresponding to respective physical times,
wherein generating NDT values comprises generating each NDT value as a function of a corresponding calendar value computed at a respective physical calendar time as a root hash value of a distributed hash tree infrastructure having as input nodes a plurality of digital input records during a respective calendar interval;
instructions for transferring the NDT values for sequential display by a display device located within a context of the event, such that a recording of the event at an actual physical recording time will include a representation of the then currently displayed NDT value; and
instructions for comparing, in a subsequent verification phase, a presented NDT value with the one of the NDT values that corresponds to the actual physical recording time, whereby inequality of the presented NDT value with the NDT value that corresponds to the actual physical recording time indicates that the purported physical recording time is not the same as the actual physical recording time.

18. The storage medium of claim 17, further comprising instructions for receiving the recording of the event; and for submitting the recording of the event together with the corresponding NDT value as one of the digital input records to the distributed hash tree infrastructure and associating with the recording of the event a corresponding computed data signature.

19. The storage medium of claim 17, further comprising instructions for generating each NDT value as a function of a sub-set of the digits of the corresponding calendar value.

20. The storage medium of claim 19, further comprising instructions for creating the NDT value as a verbal representation of the corresponding calendar value.

21. The storage medium of claim 17, further comprising instructions for creating the NDT value as a selection of at least one entry from dictionary.

22. The storage medium of claim 17, further comprising instructions for inputting a time-stamp of the recording of the event.

* * * * *